US008352881B2

(12) United States Patent
Champion et al.

(10) Patent No.: US 8,352,881 B2
(45) Date of Patent: Jan. 8, 2013

(54) METHOD, APPARATUS AND PROGRAM STORAGE DEVICE FOR PROVIDING CUSTOMIZABLE, IMMEDIATE AND RADIATING MENUS FOR ACCESSING APPLICATIONS AND ACTIONS

(75) Inventors: David Frederick Champion, Durham, NC (US); Timothy Andreas Meserth, Durham, NC (US); Mark E. Molander, Cary, NC (US); Patrick Gabor Nyeste, Raleigh, NC (US); David Thomas Windell, Raleigh, NC (US); Jeffrey John Smith, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 628 days.

(21) Appl. No.: 11/683,487

(22) Filed: Mar. 8, 2007

(65) Prior Publication Data
US 2008/0222569 A1    Sep. 11, 2008

(51) Int. Cl.
*G06F 15/177*    (2006.01)
(52) U.S. Cl. ........ 715/834; 715/723; 715/810; 715/812; 715/817; 715/818; 715/819; 715/841; 715/842; 715/856; 715/857; 715/860
(58) Field of Classification Search .................. 715/723, 715/810, 812, 817–819, 834, 841–843, 856–857, 715/860
See application file for complete search history.

(56) References Cited

U.S. PATENT DOCUMENTS

| | | | |
|---|---|---|---|
| 5,689,667 A | 11/1997 | Kurtenbach | |
| 5,701,424 A * | 12/1997 | Atkinson | 715/808 |
| 5,721,853 A | 2/1998 | Smith | |
| 5,798,760 A * | 8/1998 | Vayda et al. | 715/834 |
| 5,805,167 A * | 9/1998 | van Cruyningen | 715/808 |
| 5,828,360 A * | 10/1998 | Anderson et al. | 715/834 |
| 5,926,178 A | 7/1999 | Kurtenbach | |
| 5,940,076 A * | 8/1999 | Sommers et al. | 715/834 |
| 6,285,367 B1 | 9/2001 | Abrams et al. | |
| 6,448,987 B1 * | 9/2002 | Easty et al. | 715/834 |
| 6,549,219 B2 * | 4/2003 | Selker | 715/834 |
| 6,556,222 B1 * | 4/2003 | Narayanaswami | 715/786 |
| 6,618,063 B1 * | 9/2003 | Kurtenbach | 715/834 |
| 6,750,890 B1 * | 6/2004 | Sugimoto | 715/838 |
| 6,918,091 B2 | 7/2005 | Leavitt et al. | |
| 7,036,091 B1 * | 4/2006 | Nguyen | 715/834 |
| 7,047,501 B2 * | 5/2006 | Morcos et al. | 715/779 |
| 7,093,201 B2 * | 8/2006 | Duarte | 715/853 |
| 7,096,431 B2 * | 8/2006 | Tambata et al. | 715/834 |
| 7,284,203 B1 * | 10/2007 | Meeks et al. | 715/751 |

(Continued)

OTHER PUBLICATIONS

Screen shot Windows XP; Microsoft corporation; Windows XP; copyright 1985-2001; 4 pages.*

(Continued)

*Primary Examiner* — Steven Sax
*Assistant Examiner* — Linh K Pham
(74) *Attorney, Agent, or Firm* — William Konrad; Konrad, Raynes, Davda & Victor LLP (57) ABSTRACT

A method, apparatus and program storage device for providing customizable, immediate and radiating menus for accessing applications and actions. Upon initiation of a predetermined user action, such as a right-click operation, a primary menu is displayed and a second radial menu is displayed proximate the primary menu with the cursor position at a predetermined location for minimizing cursor manipulation for selecting a menu item from the second radial menu.

19 Claims, 10 Drawing Sheets

U.S. PATENT DOCUMENTS

| | | | | |
|---|---|---|---|---|
| 7,350,158 | B2* | 3/2008 | Yamaguchi et al. | 715/834 |
| 7,418,671 | B2* | 8/2008 | Hama et al. | 715/830 |
| 7,509,348 | B2* | 3/2009 | Burtner et al. | 1/1 |
| 7,975,237 | B2* | 7/2011 | Hama et al. | 715/786 |
| 2002/0122072 | A1* | 9/2002 | Selker | 345/834 |
| 2004/0212617 | A1* | 10/2004 | Fitzmaurice et al. | 345/440 |
| 2004/0221243 | A1* | 11/2004 | Twerdahl et al. | 715/834 |
| 2005/0034081 | A1* | 2/2005 | Yamamoto et al. | 715/810 |
| 2006/0036945 | A1* | 2/2006 | Radtke et al. | 715/708 |
| 2006/0095865 | A1* | 5/2006 | Rostom | 715/810 |
| 2006/0123357 | A1* | 6/2006 | Okamura | 715/786 |
| 2007/0152981 | A1* | 7/2007 | Im et al. | 345/173 |
| 2008/0022228 | A1* | 1/2008 | Kwon et al. | 715/838 |
| 2008/0059913 | A1* | 3/2008 | Burtner et al. | 715/854 |

OTHER PUBLICATIONS

Pie menu, Dr. Don Hopkins, Nov. 11, 2007; 12 pages; http://www.donhopkins.com/drupal/taxonomy_menu/4/49/14.*

* cited by examiner

METHOD, APPARATUS AND PROGRAM STORAGE DEVICE FOR PROVIDING CUSTOMIZABLE, IMMEDIATE AND RADIATING MENUS FOR ACCESSING APPLICATIONS AND ACTIONS

BACKGROUND OF THE INVENTION

1. Field of the Invention

This invention relates in general to graphical user interfaces, and more particularly a method, apparatus and program storage device for providing customizable, immediate and radiating menus for accessing applications and actions.

2. Description of Related Art

To work with a system, users need to be able to control the system and assess the state of the system. The portion of a system that a user engages with is often referred to as the user interface. In computer programming, a user interface refers to the graphical, textual and auditory information the program presents to the user, and the control sequences (such as keystrokes with the computer keyboard, movements of the computer mouse, and selections with the touchscreen) the user employs to control the program.

The design of a user interface affects the amount of effort the user must expend to provide input for the system and to interpret the output of the system, and how much effort it takes to learn how to do this. Usability is the degree to which the design of a particular user interface takes into account the human psychology and physiology of the users, and makes the process of using the system effective, efficient and satisfying.

A graphical user interface (or GUI, often pronounced "gooey") is a particular case of user interface for interacting with a computer that employs graphical images and widgets in addition to text to represent the information and actions available to the user. Usually the actions are performed through direct manipulation of the graphical elements. One of the many advantages of GUIs in the computer field is their ability to represent computer application programs, documents and data as graphical display elements or icons as opposed to text-based elements.

Menu driven software programs are a specific example of a GUI. Such software programs enable a user to choose from a list of items that can be accessed directly by pulling down different menus from the menu bar, rather than requiring the user to remember the name and syntax of a command. GUIs were developed so that novice users could more easily select among available commands and, thus, operate computers. In the computer field, these menu driven software programs eventually lead to the development of a windowing environment in which the user may have multiple programs and files operable at one time with a selection among multiple commands. Each command appears in a window of the program data file being worked on. To effect selection within applications and switching between windows, a hand operated pointing device becomes a critical component of a computer system running windows based software applications. One example of a pointing device is a mouse.

Applications running in a windowed environment typically have a main menu bar with more specific commands being displayed in "pull down" menus stemming from specific portions of the main menu bar command headings. When the user wants to execute a command, the user must move the pointing device so that a cursor on the display points to the command on the desired menu heading. The command heading activates a pull down menu that displays a plurality of commands available for execution. In some instances, computer systems create hierarchies of menus (also referred to as "nesting") leading to submenus to avoid excessively large menus or inappropriate menu chains. A command from the pull down menu may then be selected for execution. In accordance with conventional methods, only one command is executed at any given time since the pull down menu is typically limited to a single column of possible choices or objects. Movement amongst the menu bar and the pull down menus requires a great deal of movement of the pointing device (and thereby the cursor) to manipulate multiple windows or applications and their related commands. This movement is called "cursor commute." This results in a time-consuming, less efficient user interface. Therefore, it is difficult for the young, the elderly, handicapped, or any novice user to traverse and coordinate the position of the pointing device and, thus, the cursor with which the execution is made.

One attempt to avoid a long horizontal list of menu options has resulted in "pop-up menus." These menus have the advantage of bringing the menu to the cursor, rather than having to move the cursor to the menu. When a trigger event occurs, for example depressing the right button (known in the art as "right clicking") on the pointing device (e.g., a mouse), a window is displayed next to the cursor position and the menu items to be related are listed. When the user chooses a menu item, the menu is removed and the action corresponding to the item is initiated. Pop-up menus, however, are limited to the number of commands they can contain and they often cover up part of the work area.

Pie menus enhance pop-up menus by allowing directional selection to choose menu items. A pie menu is similar to a pop-up menu, but the pie shaped menu items surround the cursor position in a circle. In their two-dimensional form, pie menus may be round menus. The menu items are positioned around a small inactive region in the center of the circle like slices of a pie, rather than in rows or columns as in conventional linear menus. In operation, the cursor is initially located in the center of the pie in a small inactive region. The active regions representing the menu items are therefore adjacent the cursor, but each in a different direction, and menu items are selected by clicking the mouse and then pointing in the direction of the menu item.

In general, the length of time it takes to select from a menu is small (seconds or fractions of second). However, because menu selection is a high frequency operation, reducing the time involved in selecting from a menu can result in significant time-savings in the overall time it takes to accomplish a larger task. Current right-click context menus are vertically oriented and do not provide immediate access to frequently used applications. For example, to open a new word processing document, users must right click, scroll down to "new", wait for a menu to pop open, scroll over, scroll down, and click on the appropriate application.

For many users, particular applications are used more frequently than others. For example, a particular user may be opening email programs, word processing applications, and Internet browsers more than all other applications combined. Even with shortcuts located along the bottom toolbar and the Windows button, opening even the most familiarly located applications requires a significant amount of cursor manipulation and item selection.

It can be seen that there is a need for a method, apparatus and program storage device for providing customizable, immediate and radiating menus for accessing applications and actions.

SUMMARY OF THE INVENTION

To overcome the limitations in the prior art described above, and to overcome other limitations that will become apparent upon reading and understanding the present specification, the present invention discloses a method, apparatus and program storage device for providing customizable, immediate and radiating menus for accessing applications and actions.

The present invention solves the above-described problems by displaying a second radial menu upon initiation of a right-click operation. The second radial menu is displayed proximate a primary menu with the cursor position at a predetermined location for minimizing cursor manipulation for selecting a menu item from the second menu. Thus, customizable, immediate and/or radiating menus are provided for accessing applications and actions. Desired applications, e.g., most commonly used applications, are selectable with minimal cursor manipulation and selection operations. Efficiency and speed are accomplished by requiring only a short movement to a particular choice.

A menu in accordance with the principles of the present invention includes a sequential menu displayed proximate to a cursor position immediately in response to initiation of a predetermined action and a radial menu providing predetermined selectable functions, the radial menu being displayed immediately upon initiation of the predetermined action and having a center proximate the cursor and the first menu.

In another embodiment of the present invention, a computer program product is provided including a computer usable medium tangibly embodying at least one program of instructions executable by the computer to perform operations to cause a menu providing immediate access to menu items to be displayed. The menu includes a sequential menu displayed proximate to a cursor position immediately in response to initiation of a predetermined action and a radial menu providing predetermined selectable functions, the radial menu being displayed immediately upon initiation of the predetermined action and having a center proximate the cursor and the first menu.

In another embodiment of the present invention, a method for providing a context menu is provided. The method includes performing a right-click operation, in response to the right-click operation, immediately displaying a sequential menu displayed proximate to a cursor position and a radial menu providing predetermined selectable functions and having a center proximate the cursor and the first menu, positioning a cursor at a predetermined location relative to the sequential menu and the radial menu to minimize cursor manipulation when selecting a menu item from the radial menu and moving the cursor to a desired area of the radial menu and clicking at a desired area within the radial menu to initiate an application or executable action represented at the desired area of the radial menu.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method, apparatus and program storage device for providing customizable, immediate and radiating menus for accessing applications and executable actions. Upon initiation of a right-click operation, a primary menu is displayed and a second radial menu is displayed proximate the primary menu with the cursor position at a predetermined location for minimizing cursor manipulation for selecting a menu item from the second radial menu. Thus, the customizable, immediate and/or radiating menus for accessing applications and executable actions according to an embodiment of the present invention allows a user access to desired applications, e.g., most commonly used applications, with as little cursor manipulation and selection operations as possible. Efficiency and speed are accomplished by requiring only a short movement to a particular choice.

Figure 1:
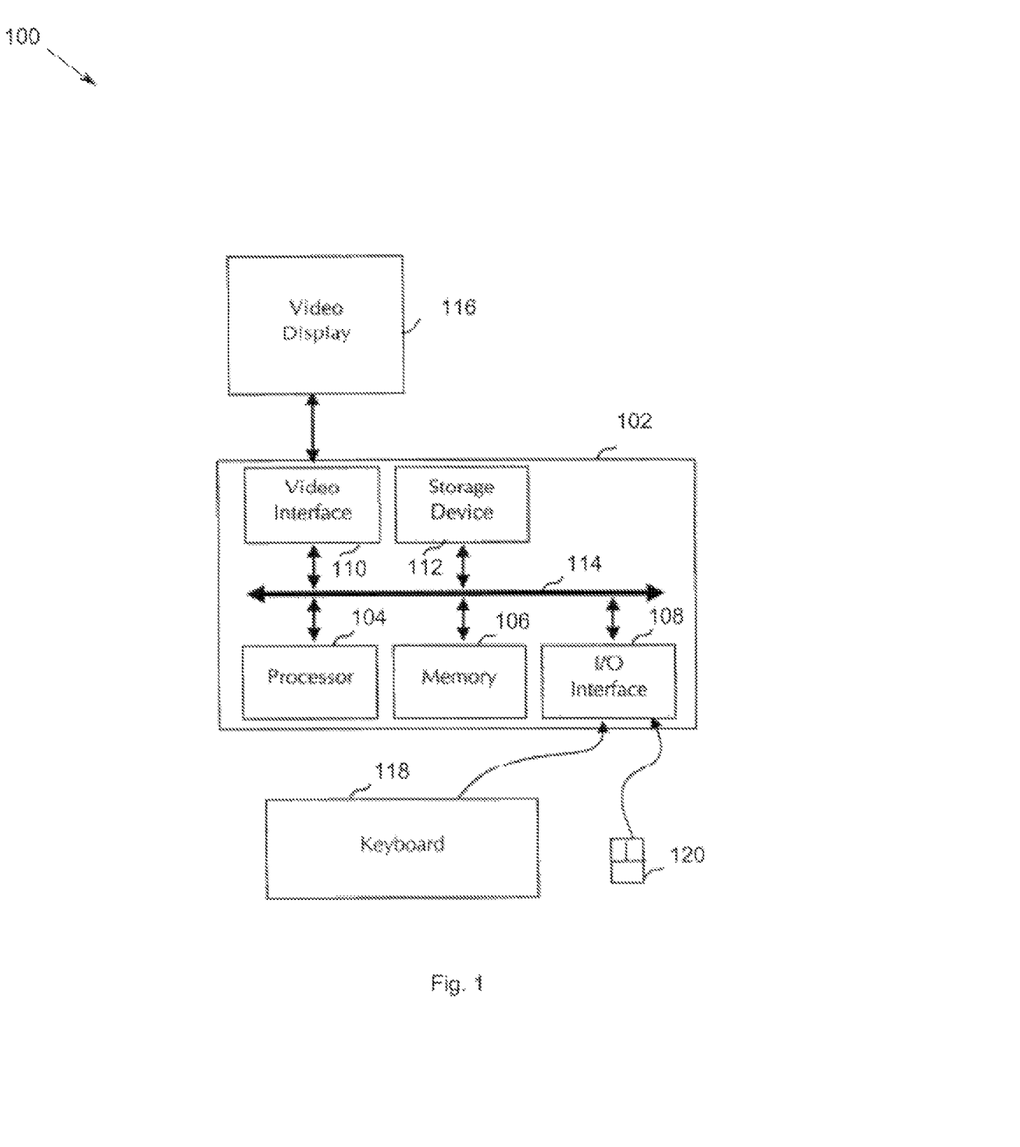
FIG. 1 illustrates a computer system that may be configured to implement customizable, immediate and radiating menus for accessing applications and actions according to an embodiment of the present invention.

FIG. 1 illustrates a computer system 100 that may be configured to implement customizable, immediate and radiating menus for accessing predetermined functions, such as applications and executable actions according to an embodiment of the present invention. The computer system 100 includes computer 102, a video display 116, and input devices 118, 120. In addition, the system 100 may also have any of a number of other output devices including line printers, laser printers, plotters, and other reproduction devices connected to the computer 102. In addition, the computer system 100 may be connected to one or more other computers using an appropriate communication channel such as a modem communications path, a computer network, or the like.

The computer 102 itself includes of a central processing unit(s) (simply referred to as a processor hereinafter) 104, a memory 106 which may include random access memory (RAW) and read-only memory (ROM), an input/output (I/O) interface 108, a video interface 110, and one or more storage devices generally represented by block 112 in FIG. 1. The storage device(s) 112 may consist of one of more of the following: a floppy disc drive, a hard disc drive, a magneto-optical disc drive, CD-ROM, or any other of a number of non-volatile storage devices well-known to those skilled in the art. Each of the components 104 to 112 is typically connected to one or more of the other devices via a bus 114 that in turn may consist of data, address, and control buses.

The video interface 110 is connected to the video display 116 and provides video signals from the computer 102 for display on the video display 116. User input to operate the computer 102 may be provided for one or more input devices. A user may use the keyboard 118 and/or a pointing device such as mouse 120 to provide input to the computer. The system according to the preferred embodiment utilizes the computer system 100 of FIG. 1 to generate and display on the video display 116 customizable, immediate and radiating menus for accessing predetermined functions, such as applications and executable actions.

Those skilled in the art will recognize the use of left click and right click because of the ubiquitous use of computer mice having at least two mouse buttons. Accordingly, when the left button is depressed, this is called a left click. When the one on the right is depressed, this is called a right click. Usually, the default configuration has the left button as the main mouse button, and is used for common tasks such as selecting objects and double-clicking. The right mouse button is often used to open contextual menus, which are pop-up menus that change depending where you click.

Herein the term context menu (or shortcut menu) is used for menus, which pop up when a predetermined action, such as a right-clicking, is performed on an item in a graphical user interface, offering a list of options, which vary depending on the context of the action, the application running, and the item selected. However, herein click will be used to refer to any operation that initiates an action such as depressing a left mouse button, depressing a right mouse button, squeezing a trigger. Further, a right-click operation refers to any action that is configured to initiate the display of a menu such as depressing a right mouse button, click-and-hold on an icon, etc.

Figure 2:
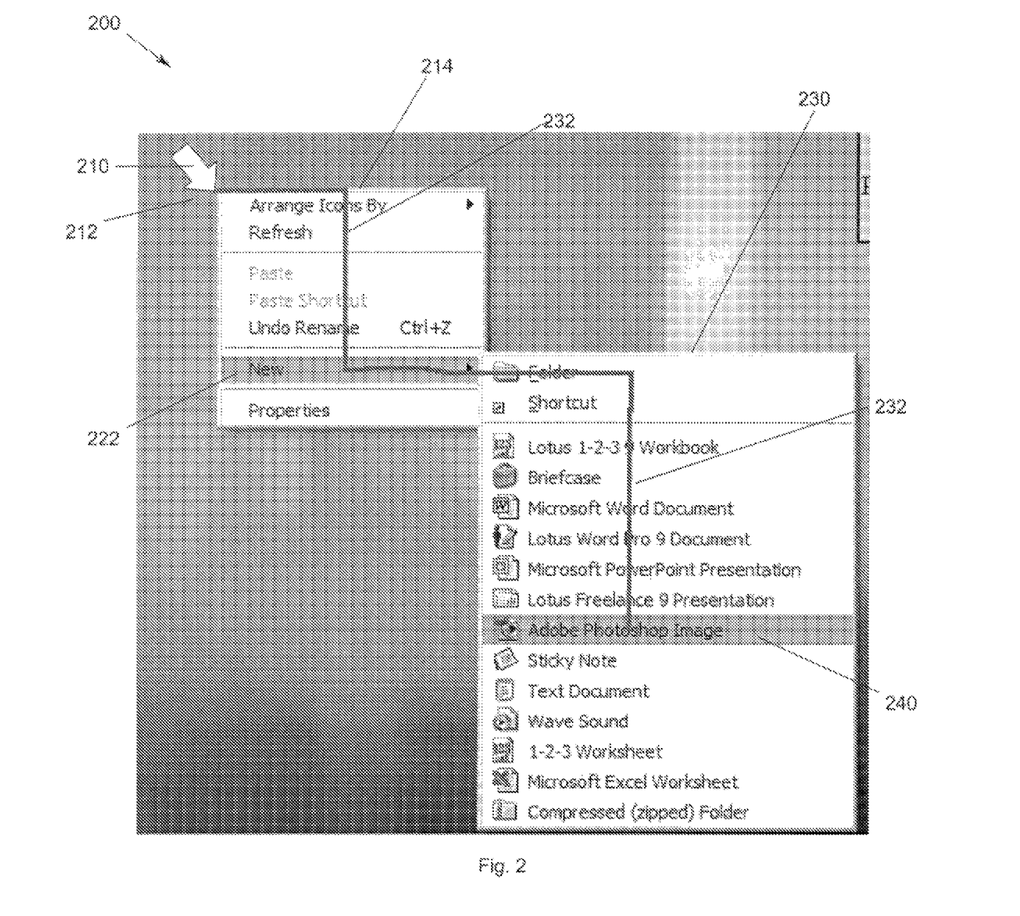
FIG. 2 illustrates a prior right-click operation.

FIG. 2 illustrates a prior right-click operation 200. Upon performing a right-click or equivalent action, the cursor 210 is at a position 212 at the top of menu 214. The cursor must be repositioned down 220 the vertically oriented menu to select "new" 222, which opens a submenu 230. The cursor must be repositioned to the right 232 and down 234 the vertically oriented submenu 230 to select an application, e.g., Adobe Photoshop Image 240 in this example. As can be seen, right-click context menus are vertically oriented and do not provide immediate access to frequently used applications. Accordingly, the operations that must be performed to open a new application take a significant amount of time, cursor manipulation, and fine motor movement.

FIGS. 3a-e illustrate right-click context menus 300 according to an embodiment of the present invention. In FIGS. 3a-e above, the various possible location of the second menu could change based upon screen location. Moreover, the second menu that is immediately accessible from the current cursor position may be a menu that radiates from the current cursor position. Adding a second menu to the right click menu that is immediately accessible from the current cursor position reduces visual search time, reduces movement time, and immediately surfaces the most pertinent features.

In FIGS. 3a-e, the three applications in this particular second radial menu are Microsoft Word, Microsoft Excel, and Microsoft Internet Explorer. Clicking on the icon or the surrounding gray area would open the specified application. However, those skilled in the art will recognize that the present invention is not meant to be limited to the applications or executable actions shown.

Figures 3, 3A, 3B, 3C, 3D, 3E:
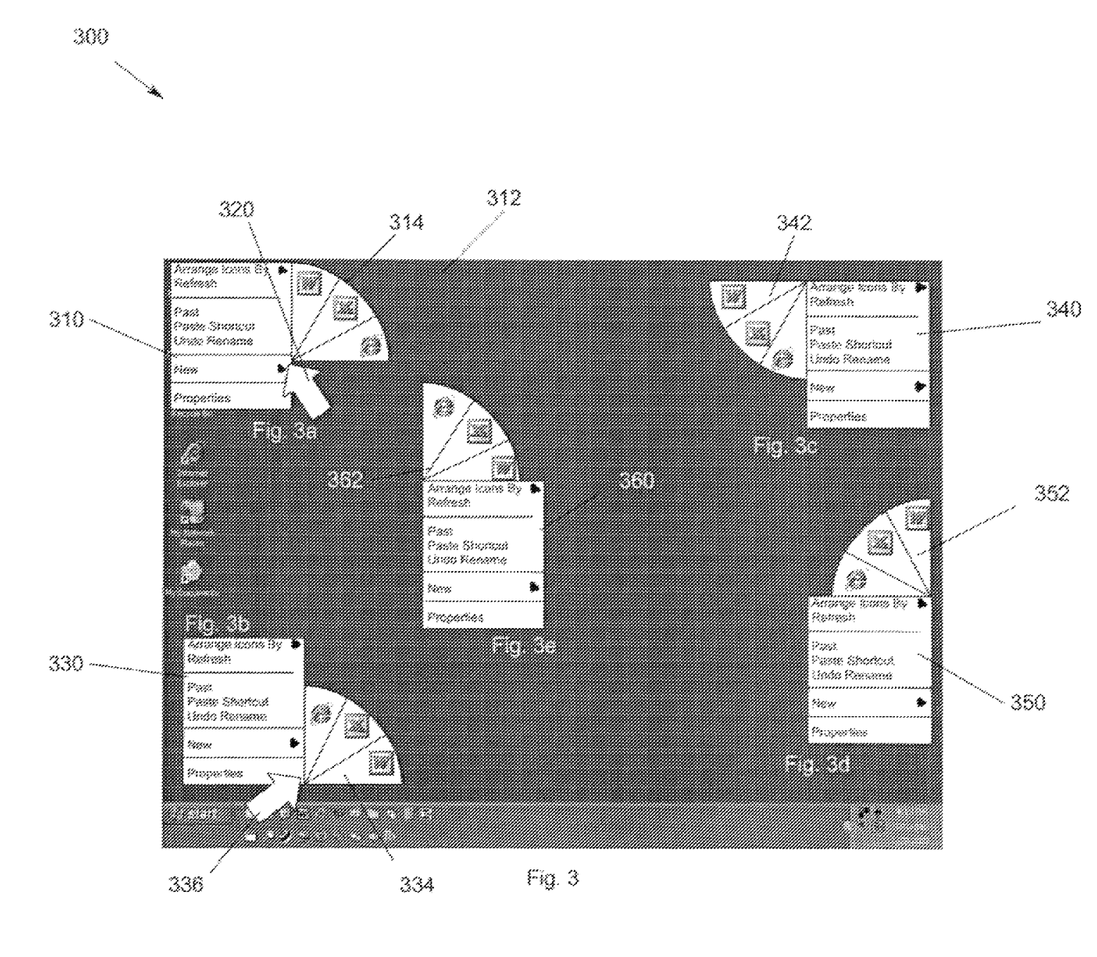
FIGS. 3a-e illustrate right-click context menus according to an embodiment of the present invention.

In FIG. 3a, the main menu 310 is shown at the upper left portion of the display 312. The main menu 310 shown in FIG. 3a is a vertical menu having sequentially listed menu items. However, those skilled in the art will recognize that the main menu 310 may be configured so that the menu items are sequentially listed in a horizontal direction. The second menu 314 extends from the edge of the main menu 310. The cursor 320 is positioned at the center 322 of the quarter-circle, second menu 314, which is the position of the cursor 320 when the right-click or other predetermined action is initiated. FIG. 3b shows the main menu 330 positioned at the lower left portion of the display 312. The second menu 334 extends from the lower right corner of the main menu 330. The cursor 336 is again positioned at the center 342 of the second menu 334, which is the position of the cursor 336 when the right-click is initiated.

FIG. 3c shows the main menu 340 positioned at the upper right portion of the display 312. The second menu 342 extends from the upper left corner of the main menu 340. FIG. 3d shows the main menu 350 positioned at the lower right portion of the display 312. The second menu 352 extends from the upper right corner of the main menu 350. FIG. 3e shows the main menu 360 positioned centrally within display 312. The second menu 362 extends from the upper left corner of the main menu 360.

According to embodiments of the present invention, a customizable, immediate, and radiating access to a second menu 314, 334, 352, 352, 362 may be implemented to place the most frequently used applications and executable actions into the second menu 314, 334, 352, 352, 362. The second menu 314, 334, 352, 352, 362 may be a standing alone menu, or proximate to the primary right-click menu 310, 330, 340, 350, 360. The second menu 314, 334, 352, 352, 362 may be configured to be a radiating menu that would appear in various locations relative to the current right-click context menu 310, 330, 340, 350, 360 based upon the screen location at the time of the right click or other predetermined operation. The second menu 314, 334, 352, 352, 362 may be configured to be automatically populated based upon most frequent usage or most recent usage. In the alternative, users could specify which applications and executable actions occupy the second menu.

As can be seen from FIGS. 3a-e, users can access the most commonly used applications with as little cursor manipulation and selection operations as possible. The advantages of efficiency and speed are accomplished by requiring only a short movement to a particular choice. Eliminating cascading menus may provide further advantages. However, those skilled in the art will recognize based upon the description herein that other choices may be provided in the second menu.

The right-click menu 310/314, 330/334, 340/342, 350/352, 360/362 may also be customized to alleviate significant amounts of navigation by enabling immediately accessible shortcuts to commonly used applications and executable actions/choices proximate a right-click context menu. This customizable access enhancement appears regardless of which application was open and takes minimal screen space that is unoccupied when the right-click operations in initiated.

Furthermore, the most frequently used applications and choices may automatically be placed onto the second menu 314, 334, 352, 352, 362. However, this option could be disabled by the user if desired. In addition, more frequently used applications and choices would utilize more menu choice space in the second menu 314, 334, 352, 352, 362, i.e., the target size would increase as frequency of use increases (see FIG. 7 where area for Word area and icon are slightly larger than the Excel and Internet Explorer areas). This would not only give the higher usage menu choices a bigger target for clicking, but would also help as a heuristic guide to the more likely choice. The right-click operation may also be configured to allow a user to specify the amount of area for a particular menu choice, lock the menu choice at a particular size, and select the number of menu choices displayed within the second menu.

Figure 4:
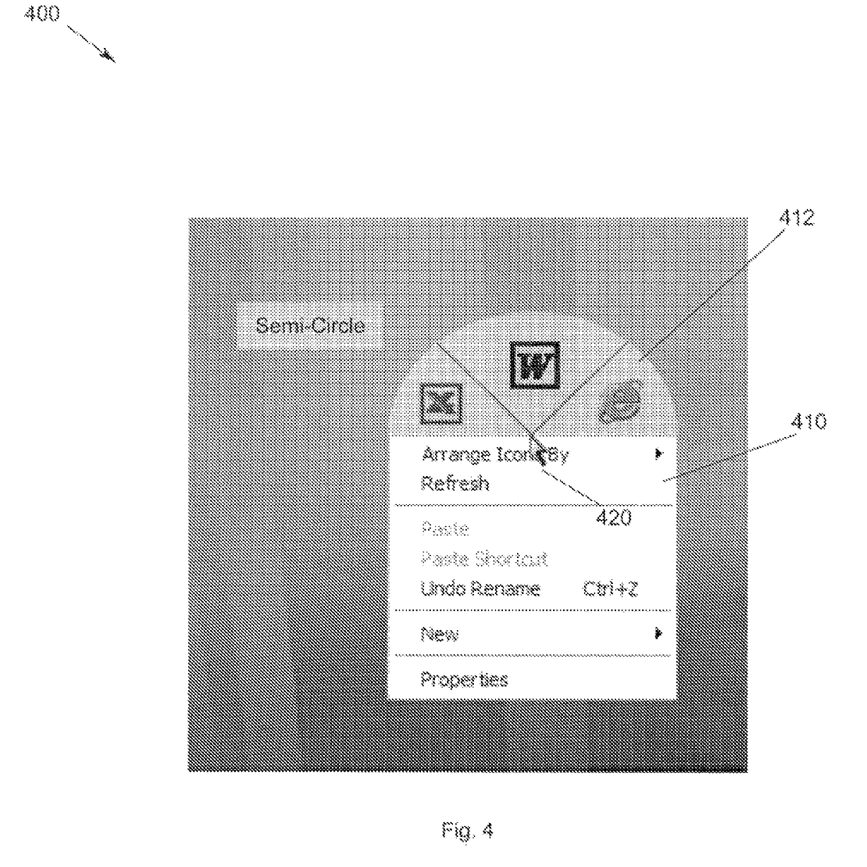
FIG. 4 shows a semicircular embodiment of a right-click context menu according to an embodiment of the present invention.

FIG. 4 shows a semicircular embodiment of a right-click context menu 400 according to an embodiment of the present invention. In FIG. 4, the second menu 412 is a semi-circle that radiates from the center of the main menu 410. Again, as will be the case throughout, the main menu 410 is a vertical menu having sequentially listed menu items. However, those skilled in the art will recognize that the main menu 410 may be configured so that the menu items are sequentially listed in a horizontal direction.

In FIG. 4, the pointer 420 is placed at the center of the right-click menu to minimize cursor manipulation to access predetermined functions, such as applications and executable actions, in the semicircular menu. Again, the second menu 412 may be configured to be automatically populated based upon most frequent usage; or in the alternative, users could specify which predetermined functions, such as applications and executable actions, occupy the second menu 412. Moreover, the semi-circle right-click context menu 412 may appear at the bottom, the right side or the left side depending upon the position of the cursor when the right-click menu is initiated in a similar manner as illustrated with the quarter-circle implementations 300 shown in FIGS. 3a-e.

Figure 5:
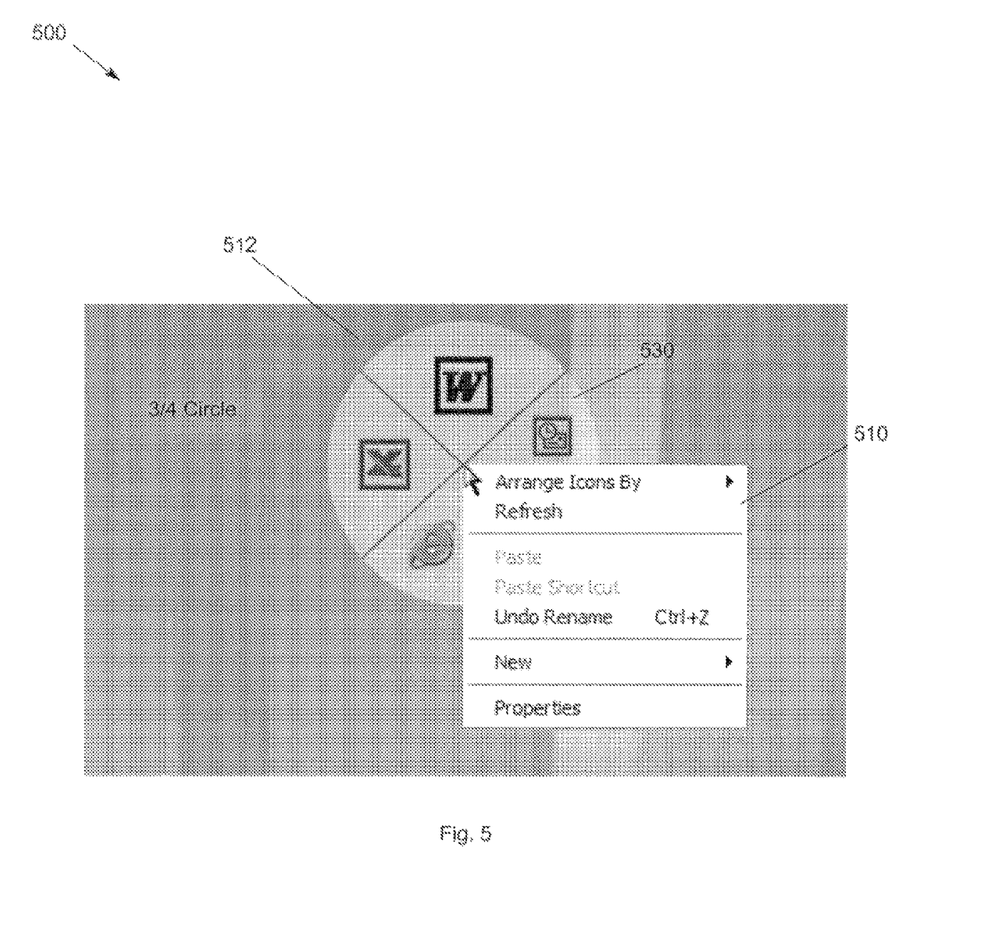
FIG. 5 illustrates a three-quarter-circle implementation of a right-click context menu according to an embodiment of the present invention.

FIG. 5 illustrates a three-quarter-circle implementation of a right-click context menu 500 according to an embodiment of the present invention. In FIG. 5, the second menu 512 is placed at the upper left corner of the main menu 510. Because the second menu 512 covers a greater area, a fourth application, i.e., a Microsoft Outlook icon 530, may be added to the second menu 512. However, the placement of the second menu 512 may change according to the cursor position when the right-click menu is initiated in a similar manner as illustrated with the quarter-circle implementations 300 shown in FIGS. 3a-e. Nevertheless, because the cursor 540 is placed at the center of the quarter-circle, each of the likely choices are close and very little cursor movement is necessary to select any of the applications.

Figure 6:
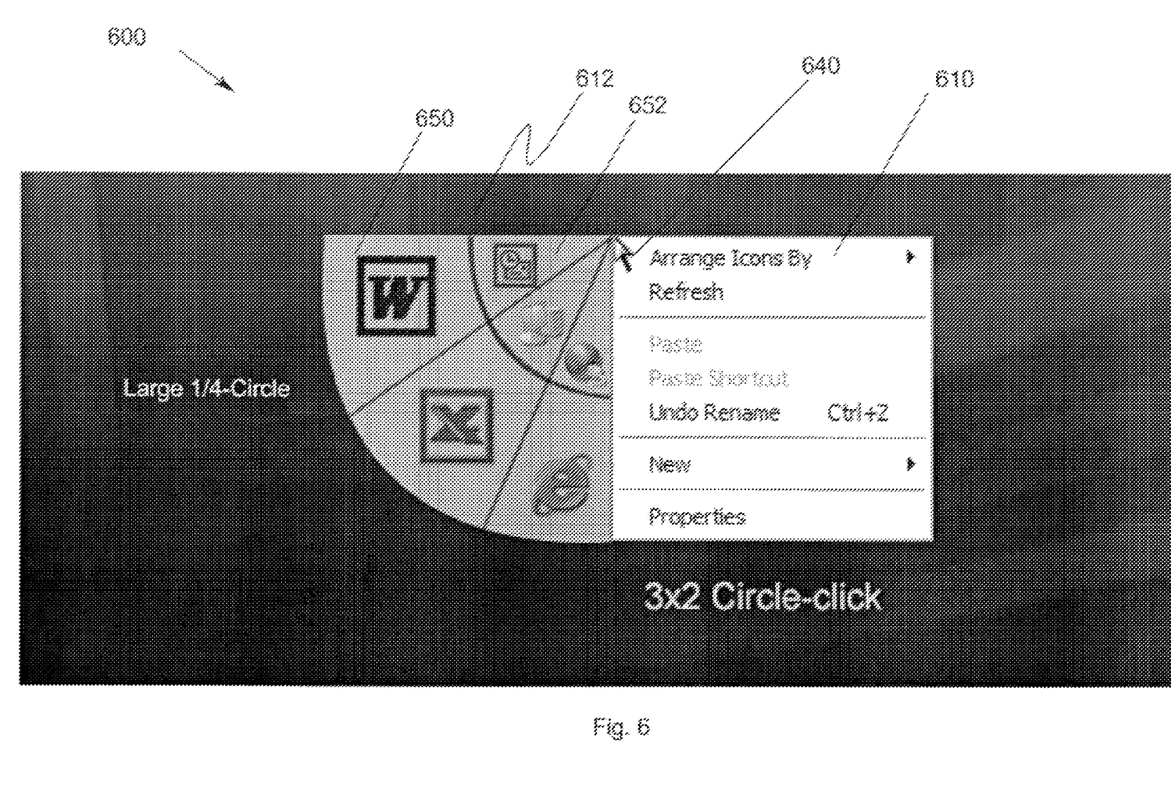
FIG. 6 shows a 3×2 double-layered implementation of a right-click context menu according to an embodiment of the present invention.

FIG. 6 shows a 3×2 double-layered implementation of a right-click context menu 600 according to an embodiment of the present invention. In FIG. 6, the right-click context menu 612 shows the more frequently used applications, i.e., Word, Excel, Internet Explorer, located in a ring 650 distal or farther from the cursor/pointer 640. However, the larger target size for the outer ring 650 of application should facilitate target acquisition times similar to the more proximately located applications and executable actions in the inner ring 652. The number and location of applications and executable actions could be customized by the user and/or automatically modified based upon usage. Moreover, the two-layer (or ring) implementation may be combined with the three-quarter-circle implementation 500 as shown in FIG. 5 to provide quick access to numerous (e.g., 9, 18, 21) applications and executable actions.

Figure 7:
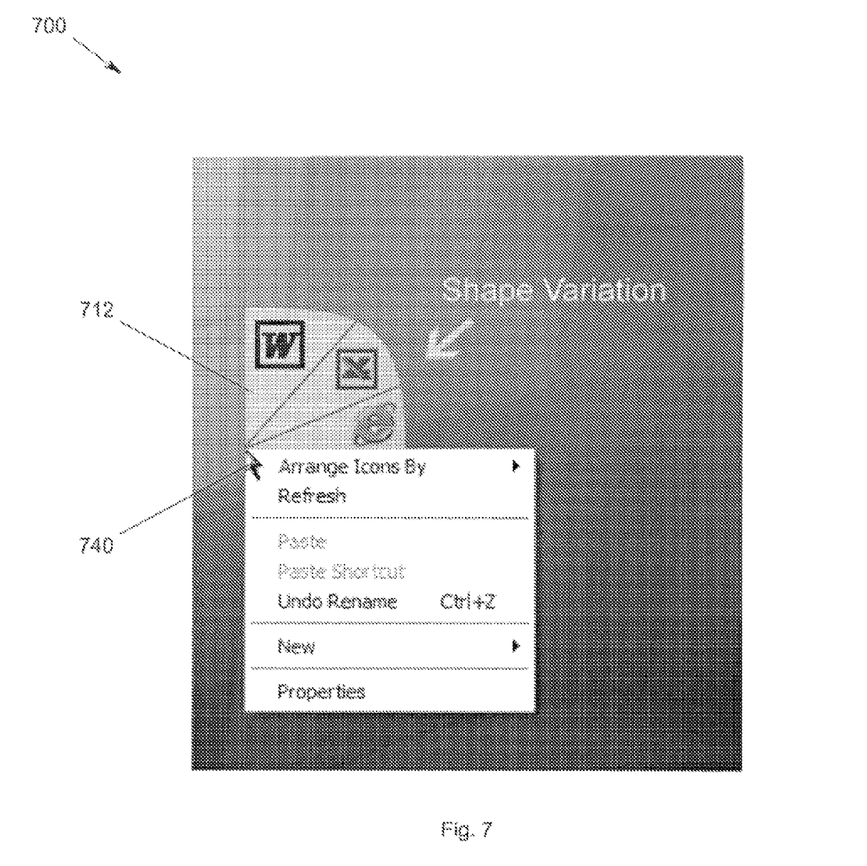
FIG. 7 shows a right-click context menu having an alternative shape according to an embodiment of the present invention.

FIG. 7 shows a right-click context menu 700 having an alternative shape according to an embodiment of the present invention. In FIG. 7, the second menu 712 is implemented using a rounded rectangle rather than a quarter circle. Those skilled in the art will recognize that a wide variety of shapes may be implemented where the second menu 712 conveniently radiates from the pointer location at 740 the time the right-click operation is initiated. Moreover, the target size may increase as frequency of use increases as shown in FIG. 7 with the area for the Word area and icon slightly larger than the Excel and Internet Explorer areas.

Figure 8:
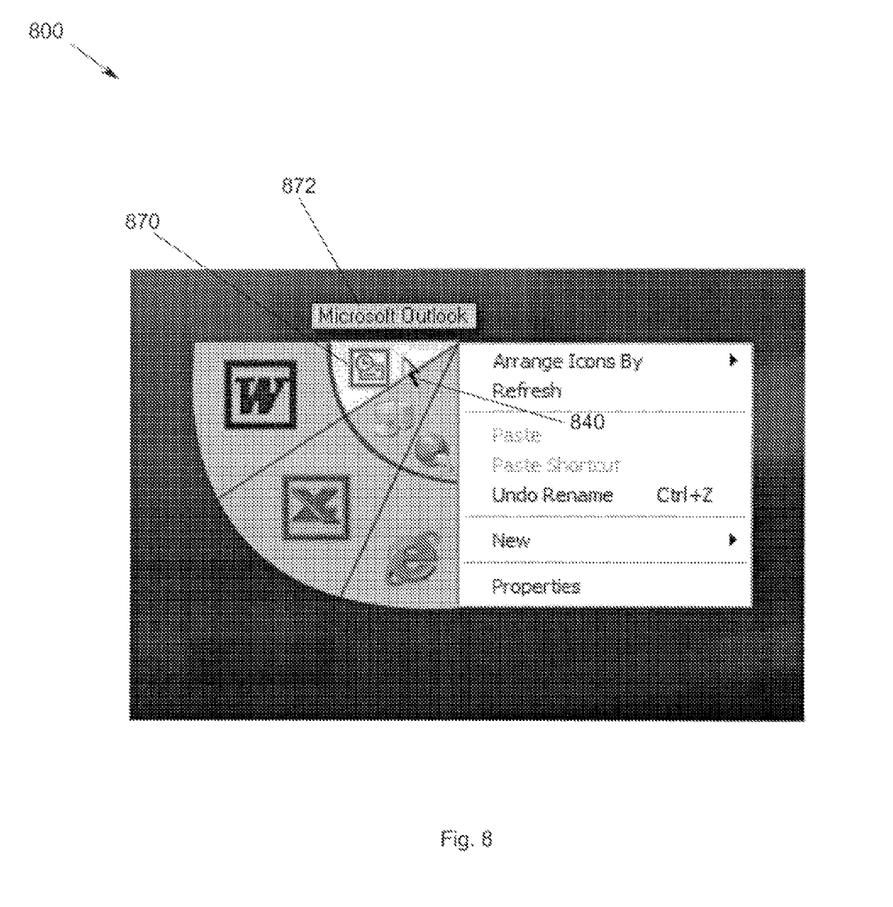
FIG. 8 shows a right-click menu wherein the cursor has been positioned over an icon in the second menu according to an embodiment of the present invention.

FIG. 8 shows a right-click menu 800 wherein the cursor has been positioned over an icon in the second radial menu according to an embodiment of the present invention. In FIG. 8, when the cursor 840 is positioned over a particular menu choice 870, the representation of the particular menu choice 870 under the cursor 840 changes. For example, the area for the Microsoft Outlook application menu 870 changes color and the application name text 872 is displayed above the menu selection 870. However, those skilled in the art will recognize that the present invention is not meant to be limited to providing a color change to an application or executable action menu when the cursor is positioned over a particular menu choice. Rather, the size of the menu choice may change, the particular menu may blink or flash, a predetermined sound may be triggered, etc.

Figure 9:
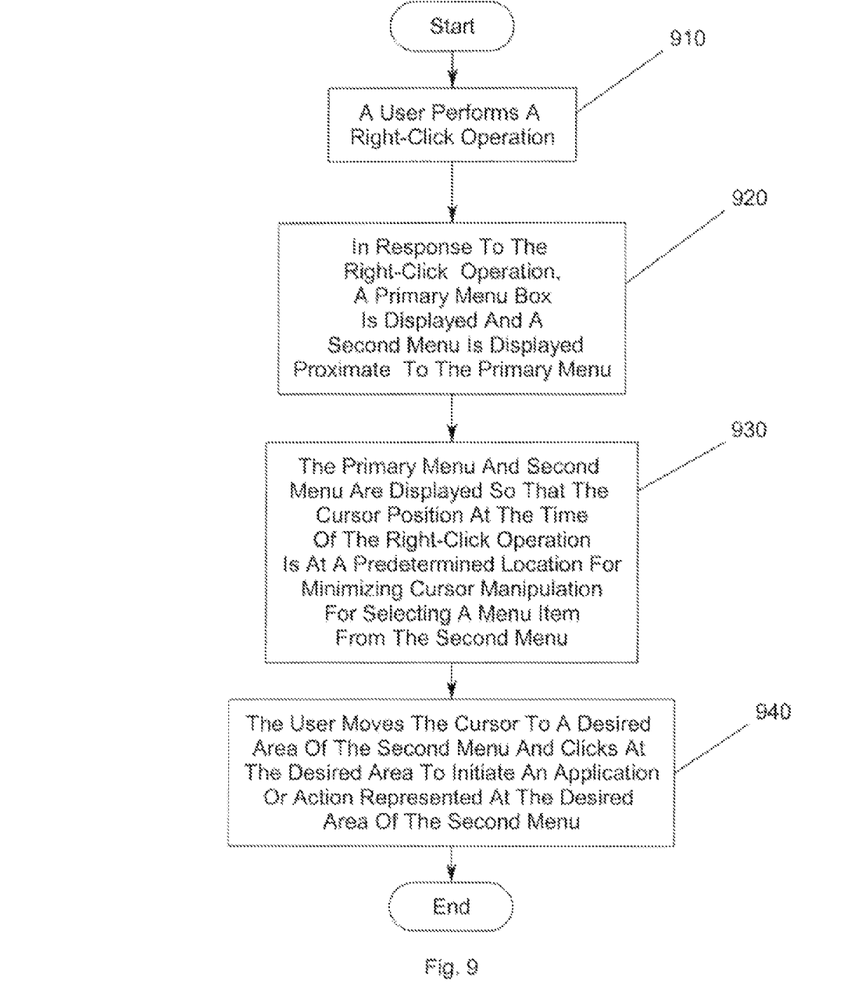
FIG. 9 is a flow chart of the method for providing customizable, immediate and radiating menus for accessing applications and actions according to an embodiment of the present invention.

FIG. 9 is a flow chart of the method for providing customizable, immediate and radiating menus for accessing applications and executable actions according to an embodiment of the present invention. In FIG. 9, a user performs a right-click operation 910. In response to the right-click operation, a primary menu box is displayed and a second menu is displayed proximate to the primary menu 920. The primary menu and second menu are displayed so that the cursor position at the time of the right-click operation is at a predetermined location for minimizing cursor manipulation for selecting a menu item from the second menu 930. The user moves the cursor to a desired area of the second menu and clicks at the desired area to initiate an application or executable action represented at the desired area of the second menu 940.

Figure 10:
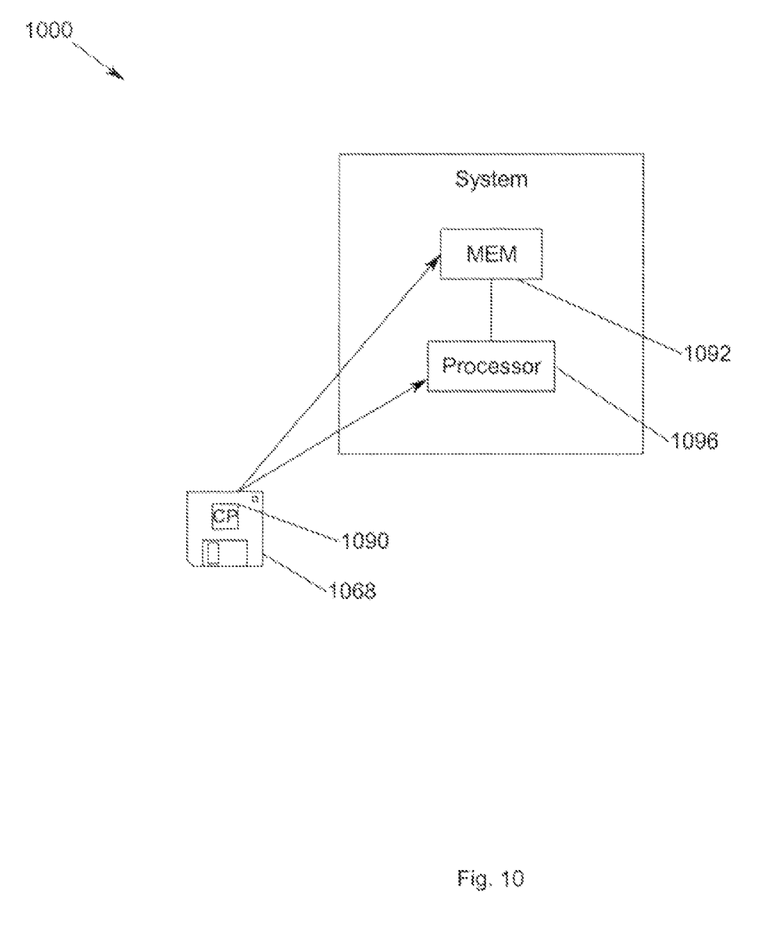
FIG. 10 illustrates a system that is configurable for executing instructions tangibly embodied in a computer-readable medium or carrier for providing customizable, immediate and radiating menus for accessing applications and actions according to an embodiment of the present invention.

The processes illustrated with reference to FIGS. 1-9 may be tangibly embodied in a computer-readable medium or carrier, e.g. one or more of the fixed and/or removable data storage devices 1068 illustrated in FIG. 10, or other data storage or data communications devices. The computer program 1090 may be loaded into the memory 1092 or into the storage device 1068 to configure the processor 1096 of FIG. 10, for execution. The computer program 1090 comprise instructions which, when read and executed by the controller 1067 of FIG. 10, causes the processor 1096 to perform the steps necessary to execute the steps or elements of the present invention.

The foregoing description of the embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A non-transitory computer readable storage medium storing at least one program of instructions executable by the computer to perform operations to cause a menu providing immediate access to menu items to be displayed, the operations comprising:
   displaying a cursor at a position on a display;
   inputting a predetermined action initiated by a user while the cursor is at the displayed position; and
   initiating display of both a sequential menu and a quarter radial menu of selectable functions on the display immediately in response to the same inputted predetermined action so that both the sequential menu and the quarter radial menu are displayed at display positions proximate to the cursor position and so that the displays of the sequential menu and the quarter radial menu proximate to the cursor position are both initiated immediately in response to the same inputted predetermined action wherein the sequential menu is a linear menu having items listed in one of a vertical column, and a horizontal row; and
   wherein the quarter radial menu is displayed as a quarter of a rounded rectangle that is divided into a plurality of sectors and having a center proximate the cursor and the sequential menu, each sector having a selectable function which is a predetermined selectable software application opening function, so that a particular software application associated with a particular software application opening function of said plurality of software application opening functions displayed by a radial menu sector, is opened by the user upon selection of the particular software application opening function; and
   wherein the displaying the quarter radial menu comprises displaying, proximate the sequential menu, a first proximal ring of selectable functions near a cursor and a second distal ring of selectable functions farther from the cursor, wherein the selectable functions positioned in the first proximal ring and second distal ring are based upon frequency of use.

2. The non-transitory computer readable storage medium of claim 1, wherein the predetermined action is a right-click operation initiated by the user so that the displaying a sequential menu and displaying a radial menu are both initiated immediately in response to a right-click operation initiated by the user.

3. The non-transitory computer readable storage medium of claim 1, wherein the displaying a radial menu having predetermined selectable functions further comprises displaying a radial menu having predetermined selectable functions including executable actions of an opened software application.

4. The non-transitory computer readable storage medium of claim 1, wherein the operations further comprise changing the software applications associated with the selectable software applications opening functions being displayed in response to user usage of software applications so that the displaying a radial menu having a plurality of selectable software application opening functions further comprises displaying a radial menu of a plurality of selectable software application opening functions for opening most recently used software applications so that a particular recently used software application associated with a particular software application opening function of said plurality of software application opening functions displayed by the radial menu for most recently used software applications, is opened by the user upon selection of the particular software application opening function.

5. The non-transitory computer readable storage medium of claim 1, wherein the displaying a radial menu having predetermined selectable functions further comprises displaying a radial menu having a selectable number of menu choices.

6. The non-transitory computer readable storage medium of claim 1, wherein the displaying a radial menu having predetermined selectable functions further comprises displaying a radial menu having menu choices with a selectable display area.

7. The non-transitory computer readable storage medium of claim 1 wherein the operations further comprise providing a setup procedure for allowing a number of menu choices in the radial menu to be selected.

8. The non-transitory computer readable storage medium of claim 1, wherein the displaying a radial menu comprises displaying an arrangement selected from a group comprising a quarter-circle divided into a plurality of sectors, the quarter-circle having a center positioned proximate the sequential menu, a semi-circle divided into a plurality of sectors, the semi-circle having a center positioned proximate the sequential menu, a quarter of a rounded-rectangle divided into a plurality of sectors, the quarter of a rounded-rectangle having a center positioned proximate the sequential menu, and a three-quarters-of-a-circle divided into a plurality of sectors, the three-quarters-of-a-circle having a center positioned proximate the sequential menu.

9. The non-transitory computer readable storage medium of claim 1, wherein the displaying a first proximal ring near a cursor and a second distal ring farther from the cursor further comprises displaying a first proximal ring and a second distal ring divided into sectors, wherein an area of the sectors of the second distal ring is greater than the area of the sectors of the first proximal ring.

10. The non-transitory computer readable storage medium of claim 1, wherein the displaying a radial menu includes displaying a plurality of sectors each including an icon representing a selectable function and changing a visual characteristic of the icon when a cursor is moved over the icon.

11. A menu for providing immediate access to menu items, comprising:
   a sequential menu adapted to be displayed proximate to a cursor position on a display immediately in response to initiation of a predetermined action wherein the sequential menu is a linear menu having items listed in one of a vertical column, and a horizontal row; and
   a quarter radial menu of selectable functions, the radial quarter menu being divided into a plurality of sectors, each sector having a selectable function which is a predetermined selectable software application opening function, the quarter radial menu being adapted to be displayed immediately upon initiation of the predetermined action and having a center proximate the cursor and the sequential menu, so that both the sequential menu and the quarter radial menu are displayed at display positions proximate to the cursor position and so that the displays of the sequential menu and the quarter radial menu proximate to the cursor position are both initiated immediately in response to the same predetermined action, wherein each software application opening function opening an associated software application in response to selection of a function by a user; and
   wherein the displaying the quarter radial menu comprises displaying, proximate the sequential menu, a first proximal ring of selectable functions near a cursor and a second distal ring of selectable functions farther from the cursor, wherein the selectable functions positioned in the first proximal ring and second distal ring are based upon frequency of use.

12. The menu of claim 11, wherein the predetermined action comprises a right-click operation initiated by a user.

13. The menu of claim 11, wherein the software applications associated with the selectable functions comprises a set of most recently used software applications.

14. The menu of claim 11, wherein the selectable functions includes a selectable number of selectable functions.

15. The menu of claim 11, wherein the selectable functions comprise a selectable display area.

16. The menu of claim 11, wherein the radial menu comprises a selectable number of selectable functions.

17. The menu of claim 11, wherein the radial menu comprises a first proximal ring disposed near a cursor and a second distal ring disposed farther from the cursor, wherein the first proximal ring and the second distal ring includes icons representing the selectable functions having a position based upon a frequency of use and wherein a display area of the sectors of the second distal ring are greater than the area of the sectors of the first proximal ring.

18. The menu of claim 11, wherein the radial menu includes a plurality of sectors having an icon representing a selectable function, wherein a visual characteristic of the icon changes when a cursor is moved over the icon.

19. A method for providing a context menu, comprising:
performing a right-click operation;
in response to the right-click operation, immediately displaying on a display both a sequential menu displayed proximate to a cursor position and a quarter radial menu of selectable functions, the radial quarter menu being divided into a plurality of sectors, each sector having a predetermined selectable software opening function, the quarter radial menu functions having a center proximate the cursor and the sequential menu so that both the sequential menu and the quarter radial menu are displayed at display positions proximate to the cursor position and so that the displays of the sequential menu and the quarter radial menu proximate to the cursor position are both initiated immediately in response to the same right-click operation, wherein the sequential menu is a linear menu having items listed in one of a vertical column, and a horizontal row, and wherein each software application opening function has an associated software application;
positioning a cursor at a predetermined location relative to the sequential menu and the quarter radial menu to minimize cursor manipulation when selecting a menu item from the radial menu; and
moving the cursor to a desired area of the quarter radial menu and clicking at a desired area within the radial menu to select a selectable software application opening function; in response to clicking at the desired area within the radial menu, opening the selected software application associated with the selected software application opening function; and
wherein the displaying the quarter radial menu comprises displaying, proximate the sequential menu, a first proximal ring of selectable functions near a cursor and a second distal ring of selectable functions farther from the cursor, wherein the selectable functions positioned in the first proximal ring and second distal ring are based upon frequency of use.

\* \* \* \* \*